US011125202B1

(12) United States Patent
Xu et al.

(10) Patent No.: US 11,125,202 B1
(45) Date of Patent: Sep. 21, 2021

(54) FEEDFORWARD ARTIFICIAL NEURAL NETWORK FOR OFF-NOMINAL SPARK CONTROL

(71) Applicants: Shuonan Xu, Troy, MI (US); Ethan A Bayer, Lake Orion, MI (US); William Attard, Brighton, MI (US); David A Lawrence, Lake Orion, MI (US); Nandanshri Bagadi, Shelby Township, MI (US)

(72) Inventors: Shuonan Xu, Troy, MI (US); Ethan A Bayer, Lake Orion, MI (US); William Attard, Brighton, MI (US); David A Lawrence, Lake Orion, MI (US); Nandanshri Bagadi, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/929,258

(22) Filed: Jul. 15, 2020

(51) Int. Cl.
*F02P 5/06* (2006.01)
*F02P 5/14* (2006.01)
*F02D 41/26* (2006.01)
*F02B 75/18* (2006.01)
*G06N 3/08* (2006.01)
(Continued)

(52) U.S. Cl.
CPC ............ *F02P 5/06* (2013.01); *F02B 75/18* (2013.01); *F02D 41/009* (2013.01); *F02D 41/26* (2013.01); *F02P 5/14* (2013.01); *G06N 3/0454* (2013.01); *G06N 3/08* (2013.01);
(Continued)

(58) Field of Classification Search
CPC ... F02P 5/06; F02P 5/14; F02D 41/009; F02D 41/26; F02D 2200/0414; F02D 2200/101; F02B 75/18; F02B 2075/1824; G06N 3/08; G06N 3/0454
See application file for complete search history.

(56) References Cited

U.S. PATENT DOCUMENTS

| 4,893,244 A | 1/1990 | Tang et al. |
| 5,774,831 A * | 6/1998 | Gupta ............... G01S 19/40 342/357.31 |

(Continued)

OTHER PUBLICATIONS

Turkson, Richard Fiifi, "Artificial neuraol network applications in the calibration of spark-ignition engines: An overview", Engineering Science and Technology, an International Journal 19, p. 1346-1359 (2016).

(Continued)

*Primary Examiner* — Sizo B Vilakazi
(74) *Attorney, Agent, or Firm* — Ralph E Smith

(57) ABSTRACT

Engine combustion phasing control techniques utilize a trained feedforward artificial neural network (ANN) to model both base and maximum brake torque (MBT) spark timing based on six inputs: intake and exhaust camshaft positions, mass and temperature of an air charge being provided to each cylinder of the engine, engine speed, engine coolant temperature. The selected target spark timing could be adjusted based on a two-dimensional surface having engine speed and air charge mass as inputs. The target spark timing adjustment could be performed only during an initial period when the trained ANN is immature. The ANN could also be trained using dynamometer data for the engine that is artificially weighted for high load regions where accuracy of spark timing is critical.

16 Claims, 3 Drawing Sheets

(51) Int. Cl.
*G06N 3/04* (2006.01)
*F02D 41/00* (2006.01)

(52) U.S. Cl.
CPC ............... *F02B 2075/1824* (2013.01); *F02D 2200/0414* (2013.01); *F02D 2200/101* (2013.01)

(56) References Cited

U.S. PATENT DOCUMENTS

| | | |
|---|---|---|
| 9,759,140 B2 | 9/2017 | Cygan, Jr. et al. |
| 10,273,928 B1 | 4/2019 | Zhao et al. |
| 2002/0073963 A1* | 6/2002 | Cullen ...................... F01L 1/34 123/406.23 |
| 2016/0258410 A1* | 9/2016 | Cygan, Jr. ............. F02D 35/028 |
| 2016/0377043 A1 | 12/2016 | Wang et al. |

OTHER PUBLICATIONS

Xiao, Baitao, "Adaptive Model Based Combustion Phasing Control for Multi Fuel Spark Ignition Engines", Clemson University TigerPrints, http://tigerprints.clemson.edu/all_dissertations (2013).

\* cited by examiner

FEEDFORWARD ARTIFICIAL NEURAL NETWORK FOR OFF-NOMINAL SPARK CONTROL

FIELD

The present application generally relates to spark ignition (SI) engines and, more particularly, to techniques for using a feedforward artificial neural network (ANN) for off-nominal spark control.

BACKGROUND

In today's engines, the spark timing with respect to the respective piston strokes affects the quality of combustion. It is therefore desirable to accurately determine and control the spark timing because poor combustion quality due to inaccurate spark timing could result in decreased fuel economy and/or engine knock. Conventional combustion phasing control techniques for SI engines use an empirical approach where multiple calibration tables and surfaces are utilized to determine the desired spark timing. This requires a substantial calibration effort and increased processor throughput. Further, for SI engines having a variable valve control (VVC) system, these empirical calibrations incur an accuracy penalty at off-nominal camshaft positions, due to superposition methodology. Accordingly, while such SI combustion phasing control systems do work for their intended purpose, there remains a need for improvement in the relevant art.

SUMMARY

According to one example aspect of the invention, a combustion control system for an engine of a vehicle is presented. In one exemplary implementation, the method comprises: a set of sensors configured to measure at least six parameters including air charge mass and temperature, intake and exhaust camshaft positions, engine speed, and engine coolant temperature and a controller configured to: access a trained feedforward artificial neural network configured to model base and maximum brake torque (MBT) spark timing based on air charge mass and temperature, intake and exhaust camshaft positions, engine speed, and engine coolant temperature, generate base and MBT spark timings for the engine using the trained feedforward artificial neural network with the six measured parameters from the set of sensors as inputs, determine a target spark timing for the engine based on at least one of the generated base and MBT spark timings, and control combustion phasing of the engine based on the target spark timing to improve at least one of combustion stability, torque response, and fuel economy.

In some implementations, the controller is further configured to adjust the target spark timing based on a two-dimensional (2D) surface having engine speed and air charge mass as inputs. In some implementations, the controller is configured to adjust the target spark timing only during an initial period when the trained ANN is immature. In some implementations, the inputs to the trained ANN are only the six measured parameters from the set of sensors. In some implementations, the trained ANN is defined by four layers including an input layer, two hidden layers with twelve neurons per layer, and an output layer. In some implementations, the engine is a turbocharged six-cylinder engine.

In some implementations, the trained ANN is obtained and provided to the controller by a separate calibration system that trains a plurality of ANNs using artificially-weighted training data, filters the plurality of trained ANNs based on their maximum error to obtain a filtered set of trained ANNs, performs a statistical analysis on each of the filtered set of trained ANNs including determining a set of statistical metrics for each of the filtered set of trained ANNs, and selects the one of the filtered set of trained ANNs that has a best combination of error at high engine loads and the set of statistical error metrics. In some implementations, the set of sensors comprise (i) at least one of a mass air flow (MAF) and intake manifold absolute pressure (MAP) sensor, (ii) an intake air temperature (IAT) sensor, (iii) intake and exhaust camshaft position sensors, (iv) an engine speed sensor, and (v) an engine coolant temperature (ECT) sensor.

According to another example aspect of the invention, a combustion control method for an engine of a vehicle is presented. In one exemplary implementation, the method comprises: accessing, by a controller of the vehicle, a trained feedforward ANN configured to model base and MBT spark timing based on air charge mass and temperature, intake and exhaust camshaft positions, engine speed, and engine coolant temperature, receiving, by the controller and from a set of sensors, at least six measured parameters including air charge mass and temperature, intake and exhaust camshaft positions, engine speed, and engine coolant temperature, generating, by the controller, base and MBT spark timings for the engine using the trained feedforward artificial neural network with the six measured parameters from the set of sensors as inputs, determining, by the controller, a target spark timing for the engine based on at least one of the generated base and MBT spark timings, and controlling, by the controller, combustion phasing of the engine based on the target spark timing to improve at least one of combustion stability, torque response, and fuel economy.

In some implementations, the method further comprises adjusting, by the controller, the target spark timing based on a 2D surface having engine speed and air charge mass as inputs. In some implementations, adjusting of the target spark timing is performed only during an initial period when the trained ANN is immature. In some implementations, the inputs to the trained ANN are only the six measured parameters from the set of sensors. In some implementations, the trained ANN is defined by four layers including an input layer, two hidden layers with twelve neurons per layer, and an output layer. In some implementations, the engine is a turbocharged six-cylinder engine.

In some implementations, the trained ANN is obtained and provided to the controller by a separate calibration system that trains a plurality of ANNs using artificially-weighted training data, filters the plurality of trained ANNs based on their maximum error to obtain a filtered set of trained ANNs, performs a statistical analysis on each of the filtered set of trained ANNs including determining a set of statistical metrics for each of the filtered set of trained ANNs, and selects the one of the filtered set of trained ANNs that has a best combination of error at high engine loads and the set of statistical error metrics. In some implementations, the set of sensors comprise (i) at least one of a MAF and a MAP sensor, (ii) an IAT sensor, (iii) intake and exhaust camshaft position sensors, (iv) an engine speed sensor, and (v) an ECT sensor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, there remains a need for accurate combustion phasing control in spark ignition (SI) engines that do not require substantial empirically calibrated surfaces. Such empirical based techniques are also inaccurate at certain operating conditions, such as off-nominal camshaft positions when valve lift and/or valve timing is adjusted by a variable valve control (WC) system. Temperature is also one external factor that can greatly affect optimal spark timing, particularly for off-nominal spark timing. Accordingly, SI engine combustion phasing control techniques are presented that use a trained feedforward artificial neural network (ANN) to model both base and maximum brake torque (MBT) spark timing based on six inputs: intake and exhaust camshaft positions, mass and temperature of an air charge being provided to each cylinder of the SI engine, engine speed, engine coolant temperature (ECT). The ANN could be trained, for example, using dynamometer data for the SI engine that is artificially weighted for high load regions where accuracy of spark timing is critical. In one exemplary implementation, the ANN could include a PQ activation function to further reduce processor throughput.

Figure 1:
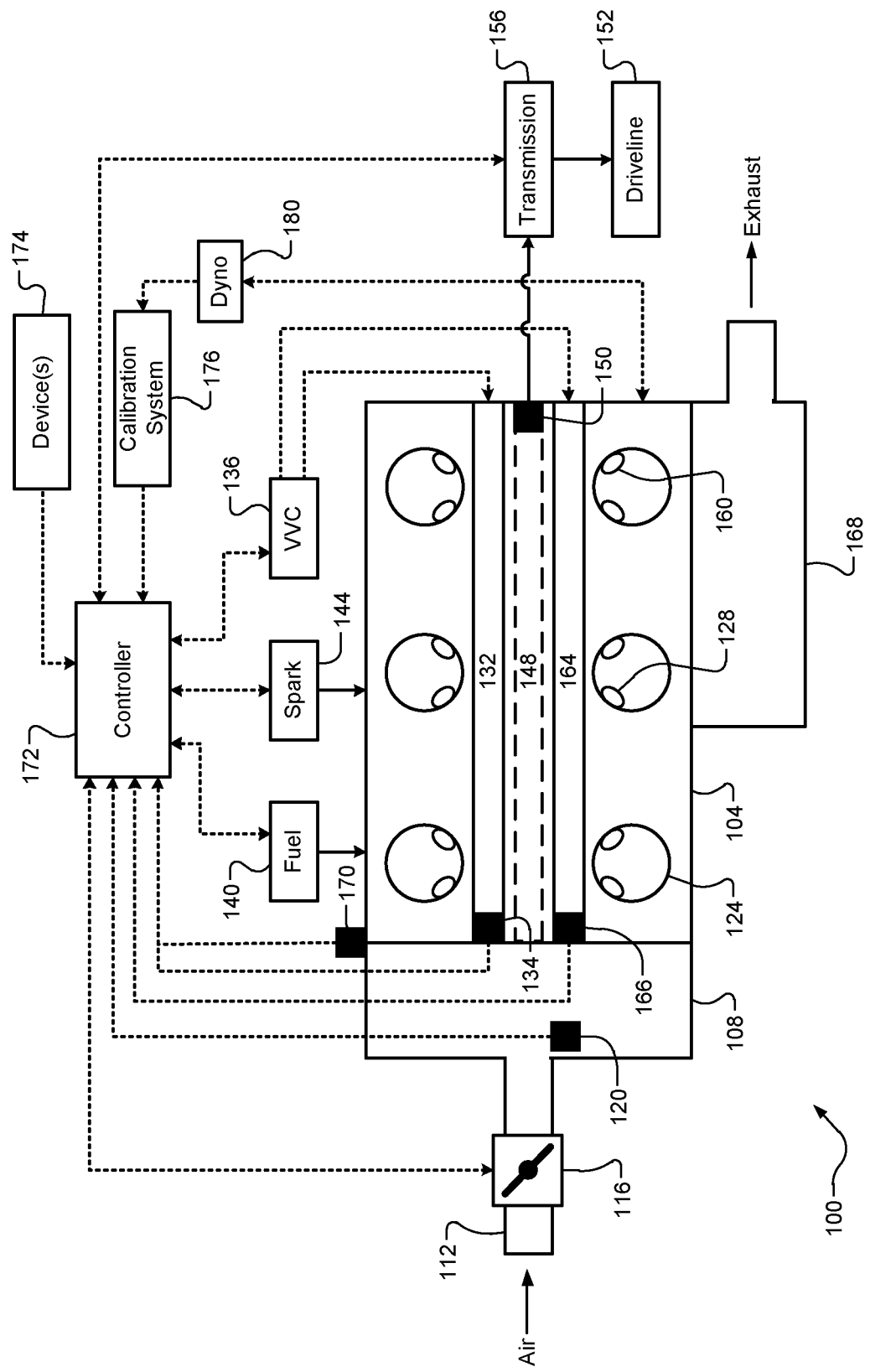
FIG. 1 is a diagram of an example spark ignition (SI) engine according to the principles of the present disclosure.

Referring now to FIG. 1, a diagram of an example vehicle 100 comprising an engine 104. While the engine 104 is shown as and described to be an SI engine, it will be appreciated that the techniques of the present disclosure could be applicable to other suitable engines, such as a diesel engine or a mixed-mode engine (e.g., capable of operating in both an SI-mode and a compression ignition (CI) mode). The engine 104 draws air into an intake manifold 108 through an induction system 112 that is regulated by a throttle valve 116. A mass air flow (MAF) and/or a manifold absolute pressure (MAP) sensor and an intake air temperature (IAT) sensor (collectively referred to as "air charge sensor 120") measures air flow/pressure indicative of a mass of as well as a temperature of an air charge being provided to each of a plurality of cylinders 124 of the engine 104. While illustrated and described as a single air charge sensor 120, it will be appreciated that there could be multiple sensors (e.g., a MAF and/or a MAP sensor in addition to an IAT sensor). Air mass, for example, could be determined or estimated using an air charge model that models mass based on intake air flow and/or air pressure, and potentially other parameters. While six cylinders are shown, it will be appreciated that the engine 104 could include any suitable number of cylinders.

Intake valves 128 regulate the flow into the respective cylinders 124. The intake valves 128 are actuated by lobes of an intake camshaft 132, which is also connected to a VVC system 136 that is configured to adjust the actuation of the intake valves 128 by the intake camshaft 132 to adjust intake valve lift and/or timing. Camshaft position sensor 134 measures a position of the intake camshaft 132. The air charge for each cylinder is combined with fuel (e.g., gasoline) from a fuel system 140 (via direct or port fuel injection) and the air/fuel mixture is compressed by respective pistons (not shown) within the cylinders 124. The compressed air/fuel mixture is then ignited by spark provided by a spark system 144 (e.g., one or more spark plugs for each respective cylinder 124).

The combustion of the compressed air/fuel mixture drives the pistons, which in turn rotatably turn a crankshaft 148 thereby generating drive torque. Engine speed sensor 150 measures a rotational speed of the crankshaft 148. The drive torque at the crankshaft 148 is then transferred to a driveline 152 of the vehicle 100 via a transmission 156. It will be appreciated that the engine 104 could comprise a forced-induction or boost system (not shown), such as a turbocharger, a supercharger, or combinations thereof. This boost system enables the engine 104 to draw in a larger air charge, which could then be combined with a larger amount of fuel to generate increased levels of drive torque.

Exhaust gas resulting from combustion is expelled from the cylinders 124 via respective exhaust valves 160 that regulate the flow out of the respective cylinders 124. The exhaust valves 160 are actuated by lobes of an exhaust camshaft 164, which is also connected to the VVC system 136. Similar to the intake valves/camshaft, the VVC system 136 is configured to adjust exhaust valve lift and/or timing. Camshaft position sensor 166 measures a position of the exhaust camshaft 164. The exhaust gas expelled from the cylinders 124 is then treated by an exhaust system 168 to eliminate or mitigate emissions before being released into the atmosphere. Non-limiting example components of the exhaust system 168 include an exhaust manifold and a three-way catalytic converter. An ECT sensor 170 measures a temperature of a coolant (water, oil, etc.) flowing through and thereby cooling the engine 104.

A controller 172 controls operation of the engine 104. The controller 172 is configured to receive input from one or more input devices 174 as well as the various sensors 120, 134, 150, 166, and 170. One non-limiting example of the one or more input devices 176 is an accelerator pedal. For example, a driver of the vehicle 100 could provide input via the accelerator pedal, which is indicative of a torque request. The controller 172 then controls the engine 104 (e.g., airflow, fuel, and spark) to achieve the torque request.

A remote calibration system 176 that is not part of the vehicle 100 comprises a computer system that interacts with a dynamometer 180 (e.g., dynamometer sensors), which could be part of or separate from the calibration system 176, to obtain dynamometer data for the engine 104, which is utilized to generate an ANN calibration that is provided as input to the controller 172 and then utilized for combustion phasing control. The term "obtain" as used herein refers to all of the generated ANN calibration being transmitted to the controller 172 for storage in its memory and subsequent retrieval for usage.

The ANN is designed such that it is capable of accurately controlling spark in an SI engine. This design process involves the selection of various parameters, such as, but not limited to, input/output type and quantity, number of hidden layers, number of neurons per layer, and training/transfer functions. In one exemplary implementation, the optimal ANN design is six inputs (air charge mass/temperature, engine speed, intake/exhaust camshaft positions, and ECT), two outputs (base and MBT spark timing), two hidden layers, twelve neurons per layer, a Bayesian regularization backpropagation training function (also known as "trainbr"), and a hyperbolic tangent sigmoid transfer function (also known as "tansig"). It will be appreciated, however, that this is merely one exemplary ANN design and that these parameters could vary depending on the specific vehicle/engine application. For example only, another suitable training function, such as a Levenberg-Marquardt backpropagation training function (also known as "trainlm"), and/or another suitable transfer function, such as rectified linear units (also known as "ReLu"), could be utilized. Other suitable types and/or quantities of inputs and/or outputs could also be utilized. As previously mentioned, in one exemplary implementation, a PQ activation function could be implemented to further reduce processor throughput.

Figure 2:
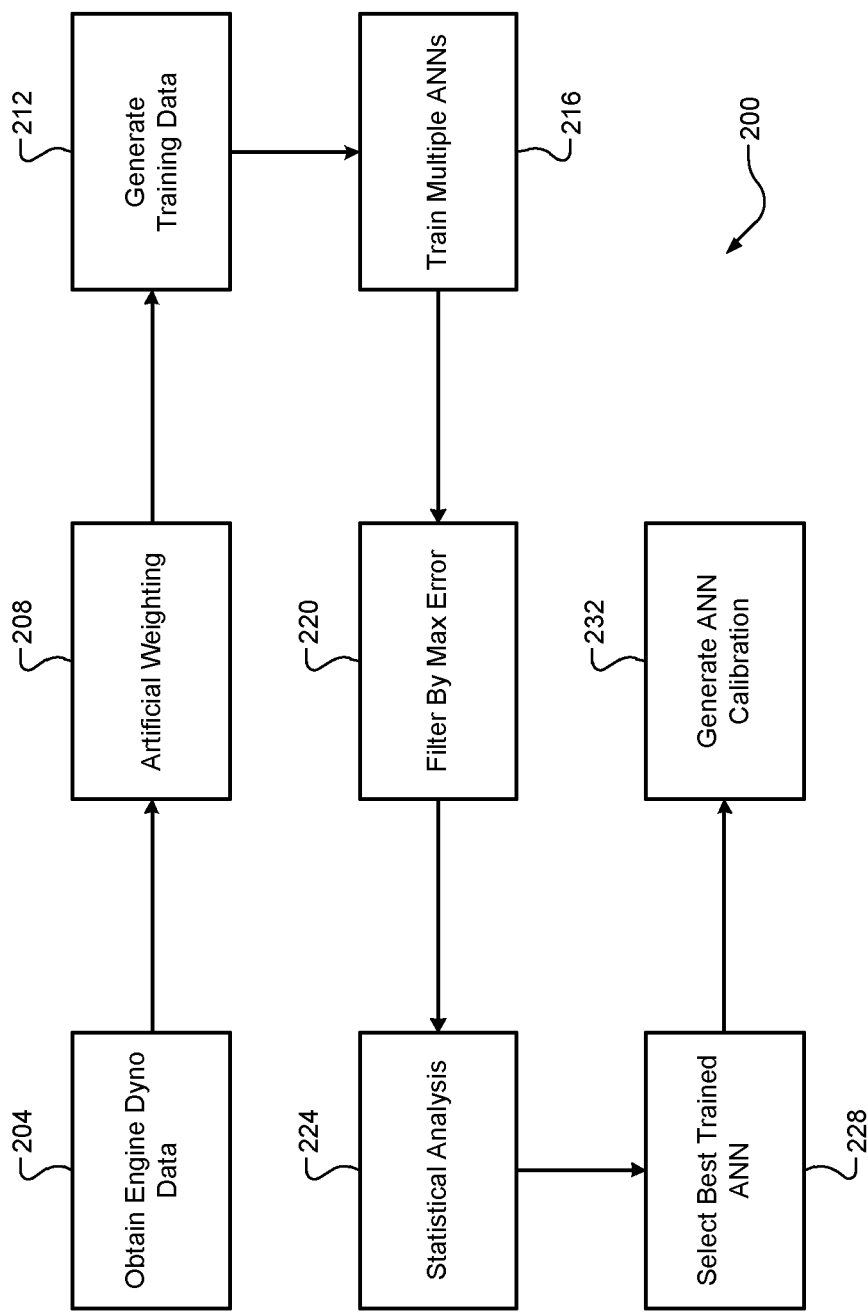
FIG. 2 is a functional block diagram of an example artificial neural network (ANN) training/calibration architecture according to the principles of the present disclosure.

Referring now to FIG. 2, a functional block diagram of an example ANN training architecture 200 is illustrated. At 204, engine dynamometer ("dyno") data is gathered and is then artificially weighted at 208. This artificial weighting involves artificially weighting the dyno data at higher engine loads because accurate spark control is critical at these operating ranges. For example, an over advanced spark at very high engine loads could cause engine damage at certain conditions. At 212, training data is generated using the weighted engine dyno data. For example, a large quantity of training data (e.g., 10,000 to 40,000 data points) could be generated from the smaller quantity of engine dyno data (e.g., 1000 to 2000 data points) using any suitable mathematical method. For example only, this could include running simulations using the existing dyno data to generate additional training data. This is performed because ANN training requires a large number of training samples to reduce the risk of overfitting. In addition, a large quantity of training data ensures that each ANN sees every possible engine operating condition in the training phase so that they do not extrapolate into unknown regions in real-world applications. At 216, the ANN is trained multiple times to obtain a plurality of trained ANNs.

At 220, maximum error filtering of the trained ANNs is performed to obtain a desired number of trained ANNs. For example only, the desired number of trained ANNs could be five. This maximum error filtering involves discarding any trained ANNs having a maximum error (e.g., either base or MBT spark timing) greater than an error threshold. At 224, a statistical analysis of the remaining trained ANNs is performed. The set of statistical error metrics include, for example only, a sum of squares due to error (SSE), a root-mean-square error (RMSE), and an error distribution (e.g., across a full range of engine loads). At 228, the best performing trained ANN (based on the set of statistical error metrics) is then selected based on the statistical error metric(s). For example only, this could be the trained ANN that has the best combined performance (SSE and RMSE) in addition to lower error at high engine loads. At 232, the selected trained ANN is utilized to generate an ANN calibration for use by the controller 172 of the engine 104. This could include, for example, loading the ANN calibration into a memory of the controller 172 for subsequent spark control.

Figure 3:
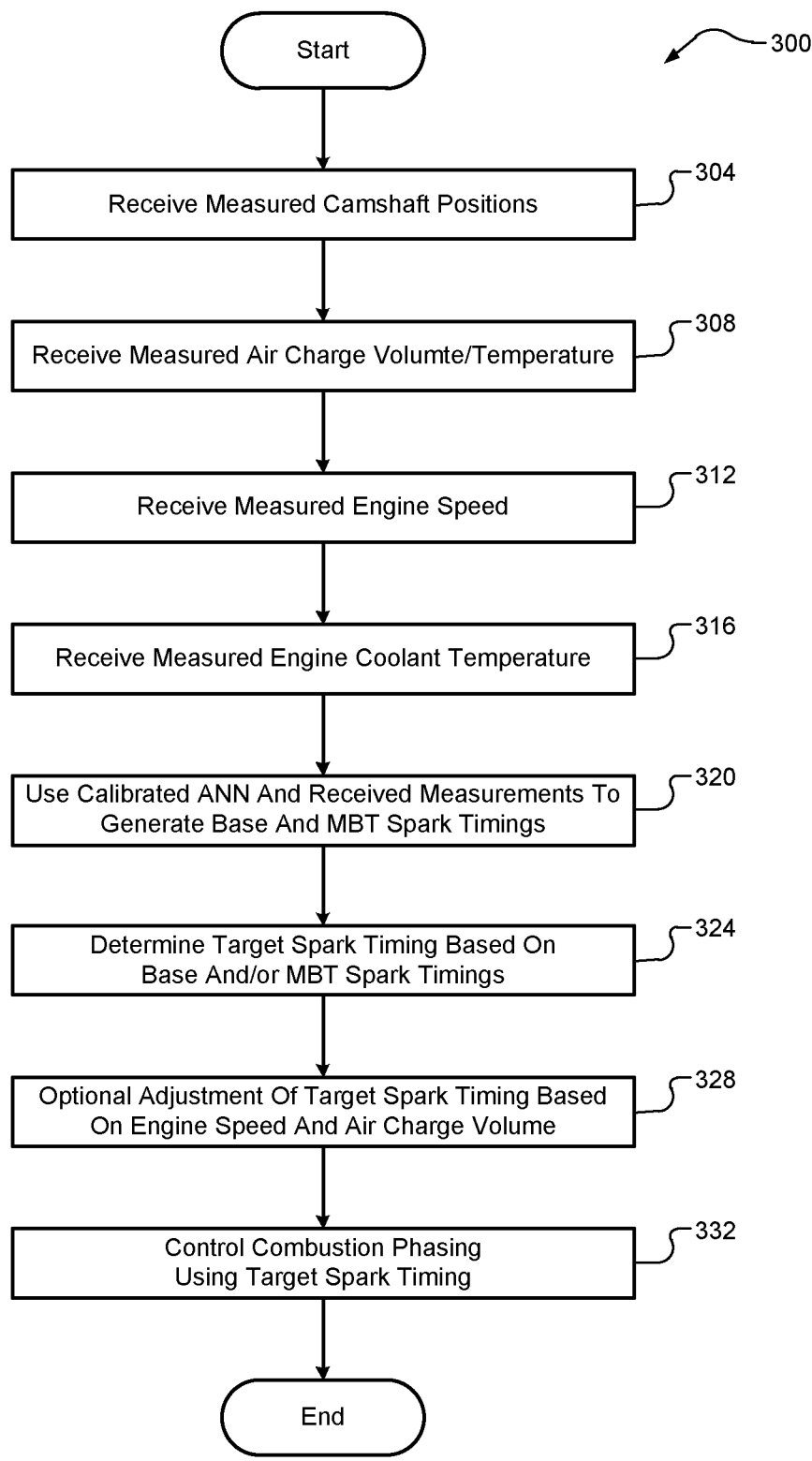
FIG. 3 is a flow diagram of an example combustion phasing control method for an SI engine according to the principles of the present disclosure.

Referring now to FIG. 3, a flow diagram of an example combustion phasing control method 300 for an SI engine (e.g., engine 104) is illustrated. This method 300 is implemented by the controller 172 of the engine 104 after the generation of the ANN calibration at 232 in FIG. 2. At 304, the controller 172 receives the measured camshaft positions from camshaft position sensors 134, 166. At 308, the controller 172 receives the estimated air charge mass and measured air charge temperature based on measurements from air charge sensor 120 (e.g., air charge mass could be estimated using an air charge model based on MAF and/or MAP). At 312, the controller 172 receives a measured engine speed from engine speed sensor 150. At 316, the controller 172 receives the measured ECT from the ECT sensor 170. At 320, the controller 172 uses the measured parameters as inputs to the calibrated ANN to generate base and MBT spark timings. At 324, the controller 172 then determines a target spark timing based on the base and/or MBT spark timings. For example, one of these generated spark timings could be selected or some combination thereof could be determined. At optional 328, the controller 172 adjusts the target spark timing using an empirical 2D surface with engine speed and air charge mass as inputs. This empirical 2D surface (e.g., a look-up table) could be predetermined based on testing data and its adjustment could further increase the accuracy of the modeled base and MBT spark timings, e.g., particularly during an initial period when the ANN is immature (i.e., new and still learning). At 332, the controller 172 controls combustion phasing (e.g., timing of spark provided by spark system 144) based on the target spark timing. The method 300 then ends or returns to 304.

It will be appreciated that the term "controller" as used herein refers to any suitable control device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A combustion control system for an engine of a vehicle, the system comprising:
   a set of sensors configured to measure at least six parameters including air charge mass and temperature, intake and exhaust camshaft positions, engine speed, and engine coolant temperature; and
   a controller configured to:
     access a trained feedforward artificial neural network configured to model base and maximum brake torque (MBT) spark timing based on air charge mass and temperature, intake and exhaust camshaft positions, engine speed, and engine coolant temperature;
     generate base and MBT spark timings for the engine using the trained feedforward artificial neural network with the six measured parameters from the set of sensors as inputs;

determine a target spark timing for the engine based on at least one of the generated base and MBT spark timings; and control combustion phasing of the engine based on the target spark timing to improve at least one of combustion stability, torque response, and fuel economy.

2. The system of claim 1, wherein the controller is further configured to adjust the target spark timing based on a two-dimensional (2D) surface having engine speed and air charge mass as inputs.

3. The system of claim 2, wherein the controller is configured to adjust the target spark timing only during an initial period when the trained ANN is immature.

4. The system of claim 1, wherein the inputs to the trained ANN are only the six measured parameters from the set of sensors.

5. The system of claim 1, wherein the trained ANN is defined by four layers including an input layer, two hidden layers with twelve neurons per layer, and an output layer.

6. The system of claim 1, wherein the trained ANN is obtained and provided to the controller by a separate calibration system that trains a plurality of ANNs using artificially-weighted training data, filters the plurality of trained ANNs based on their maximum error to obtain a filtered set of trained ANNs, performs a statistical analysis on each of the filtered set of trained ANNs including determining a set of statistical metrics for each of the filtered set of trained ANNs, and selects the one of the filtered set of trained ANNs that has a best combination of error at high engine loads and the set of statistical error metrics.

7. The system of claim 1, wherein the set of sensors comprise (i) at least one of a mass air flow (MAF) and intake manifold absolute pressure (MAP) sensor, (ii) an intake air temperature (IAT) sensor, (iii) intake and exhaust camshaft position sensors, (iv) an engine speed sensor, and (v) an engine coolant temperature (ECT) sensor.

8. The system of claim 1, wherein the engine is a turbocharged six-cylinder engine.

9. A combustion control method for an engine of a vehicle, the method comprising:

accessing, by a controller of the vehicle, a trained feedforward artificial neural network (ANN) configured to model base and maximum brake torque (MBT) spark timing based on air charge mass and temperature, intake and exhaust camshaft positions, engine speed, and engine coolant temperature;

receiving, by the controller and from a set of sensors, at least six measured parameters including air charge mass and temperature, intake and exhaust camshaft positions, engine speed, and engine coolant temperature;

generating, by the controller, base and MBT spark timings for the engine using the trained feedforward artificial neural network with the six measured parameters from the set of sensors as inputs;

determining, by the controller, a target spark timing for the engine based on at least one of the generated base and MBT spark timings; and controlling, by the controller, combustion phasing of the engine based on the target spark timing to improve at least one of combustion stability, torque response, and fuel economy.

10. The method of claim 9, further comprising adjusting, by the controller, the target spark timing based on a two-dimensional (2D) surface having engine speed and air charge mass as inputs.

11. The method of claim 10, wherein adjusting of the target spark timing is performed only during an initial period when the trained ANN is immature.

12. The method of claim 9, wherein the inputs to the trained ANN are only the six measured parameters from the set of sensors.

13. The system of claim 9, wherein the trained ANN is defined by four layers including an input layer, two hidden layers with twelve neurons per layer, and an output layer.

14. The method of claim 9, wherein the trained ANN is obtained and provided to the controller by a separate calibration system that trains a plurality of ANNs using artificially-weighted training data, filters the plurality of trained ANNs based on their maximum error to obtain a filtered set of trained ANNs, performs a statistical analysis on each of the filtered set of trained ANNs including determining a set of statistical metrics for each of the filtered set of trained ANNs, and selects the one of the filtered set of trained ANNs that has a best combination of error at high engine loads and the set of statistical error metrics.

15. The method of claim 9, wherein the set of sensors comprise (i) at least one of a mass air flow (MAF) and intake manifold absolute pressure (MAP) sensor, (ii) an intake air temperature (IAT) sensor, (iii) intake and exhaust camshaft position sensors, (iv) an engine speed sensor, and (v) an engine coolant temperature (ECT) sensor.

16. The method of claim 9, wherein the engine is a turbocharged six-cylinder engine.

* * * * *